United States Patent [19]
Misaka et al.

[11] 3,763,038
[45] Oct. 2, 1973

[54] PROCESS FOR PURIFYING WATER THAT CONTAINS ORGANIC MATTER

[75] Inventors: Yasunao Misaka; Mitsuo Kuriyama, both of Yokohama; Tsuneo Mukai, Tokyo, all of Japan

[73] Assignee: Kurita Water Industries Limited, Osaka, Japan

[22] Filed: Mar. 29, 1971

[21] Appl. No.: 128,961

[30] Foreign Application Priority Data
Apr. 10, 1970 Japan..........................45/30595
Oct. 23, 1970 Japan..........................45/93312

[52] U.S. Cl................. 210/4, 210/11, 210/18, 210/53
[51] Int. Cl.............................................. C02c 1/06
[58] Field of Search.................. 210/4, 42, 3-8, 210/18, 14, 15, 42, 59, 53

[56] References Cited
UNITED STATES PATENTS
3,135,687  6/1964  Jung et al. ............................ 210/47
3,423,309  1/1969  Albertson ............................... 210/5
3,480,144  11/1969  Barth et al. ............................ 210/4

Primary Examiner—Michael Rogers
Attorney—Otto John Munz

[57] ABSTRACT

A process for purifying water that contains organic matter which comprises mixing a coagulant consisting of either a ferric salt alone or a ferrous salt and an oxidant into sewage that contains organic matter in a high concentration, causing the coagulant-containing sewage to flow into a flocculating region, agitating the sewage for floc formation and growth, separating the floc in a sedimentation region into effluent and sludge, thus obtaining as the supernatant a sewage that contains organic matter in a low concentration, introducing said sewage into an aeration tank in which iron floc is formed, allowing microorganisms to be adsorbed on the iron floc while the sewage is being aerated in said tank, thereby to obtain highly pure treated water.

13 Claims, 1 Drawing Figure

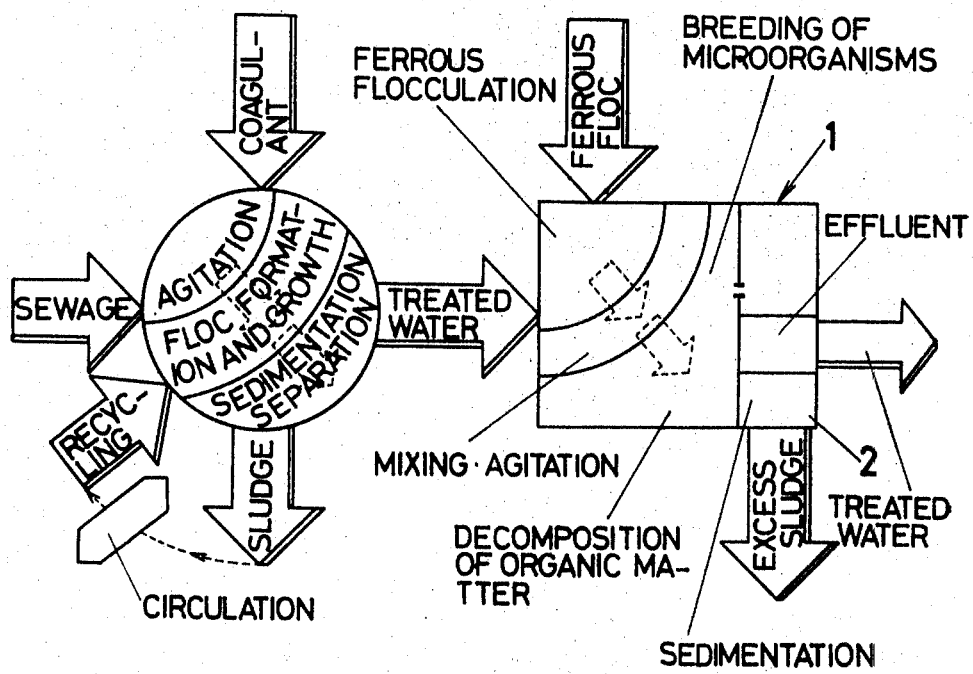

PROCESS FOR PURIFYING WATER THAT CONTAINS ORGANIC MATTER

This invention relates to a purification process whereby polluted water such as sanitary sewage that contains organic matter in a high concentration can be purified to very pure, sparkling water.

Generally speaking, sewage disposal is in most cases performed by biological process, i.e., the activated sludge method. Usually, however, the process can hardly purify the sewage to a cleaner state below a B.O.D. range of 10 to 30 p.p.m. or a C.O.D. range of 50 to 110 p.p.m. Another difficulty is that, while the sludge precipitated in the first settling basin is highly filterable and disposable, the excess sludge secondarily produced by the active sludge disposal has such a high moisture content that it exhibits very poor filterability and disposability.

After diversified investigations in search of a process which can overcome the foregoing difficulties of the conventional processes and achieve enhanced disposal efficiency, we have discovered a treatment process as briefly summarized below.

The process of the present invention is a combination of a process which depends on coagulation, for example for the removal of organic matter from the sewage and a process for removing the residual organic matter by the action of microorganisms. More particularly, the invention provides a water purification process which comprises a series of treatment steps of mixing a coagulant consisting of either a ferric salt alone or a ferrous salt and an oxidant into a sewage that contains a high concentration of organic matter, introducing the coagulant-containing sewage into a flocculating region, agitating the sewage for floc formation and growth, and separating the sewage in a sedimentation region into effluent and sludge, and another series of treatment steps of introducing the resulting effluent which is a sewage of a low organic matter concentration into an aeration tank wherein iron floc is formed, and, while the sewage is being aerated, allowing the microorganisms contained therein to be adsorbed on the iron floc.

Another feature of the treatment process according to the present invention is that ferrous ions are allowed to be present in the sewage that contains a low concentration of organic matter so that iron floc is formed therein.

Still another feature of the invention is that the sludge separated out by coagulation is recycled to the flocculating region.

Other objects, advantages and features of the present invention will become apparent from the following detailed description taken in conjunction with the accompanying drawing.

The single FIGURE in the accompanying drawing is a schematic diagram illustrating the arrangement of component units required for the sewage disposal according to our invention.

By the process of the invention, as schematically illustrated in the drawing, the sewage that contains organic matter in a high concentration is admitted into a flocculating region following the addition of a coagulant (or while such agent is being added), and is agitated therein for the formation and growth of floc, and then is separated in a sedimentation region into effluent and sludge. While the procedure is similar to the conventional processes, the coagulant to be added in accordance with the invention is of improved type. Moreover, the sludge once formed by the above procedure is recycled to the flocculating region to obtain treated water (supernatant) with a lower organic matter content, though this recycling step may be omitted.

As a result of various experiments conducted to date, it has now been found that the most useful coagulants for the disposal by flocculation of heavily polluted water are iron salts, particularly ferric salts. It has also been found that, of the iron salts, ferrous compounds, such as ferrous sulfate which is readily available on a commercial basis but will not usually initiate flocculation unless the pH is on the alkaline side with a value of 11.5 or more, can easily cause flocculation in the neutral and even slightly acidic regions, when they are used in combination with oxidants such as hydrogen peroxide or chlorine. Table 1 gives the C.O.D. values of treated waters obtained by adding many different coagulants including those mentioned above to sewage portions from sand beds, flocculating the samples in jar testers, keeping them quiescent for 20 minutes, and then filtering with filter paper (No. 50).

As can be seen from the table, iron salts, particularly ferric compounds (as indicated by a single asterisk mark), achieve excellent flocculation effects for disposal of waste water such as sanitary sewage, and even ferrous compounds can prove as effective

TABLE 1

| Coagulant | Amount added | Floc pH | C.O.D. treated water |
|---|---|---|---|
| None (untreated sewage) | 0 mg/l | 7.4 | 350 mg/l |
| $FeCl_3 \cdot 6H_2O$ | 200 | 5.55 | 35.4 |
| $Fe(SO_4)_3 \cdot 18H_2O$* | 200 | 5.05 | 34.1 |
| $FeSO_4 \cdot 7H_2O$ | 200 | 11.50 | 56.2 |
| $FeSO_4 \cdot 7H_2O+$** | 200 | | |
| 30% $H_2O_2$ | 0.04 ml/l | 6.40 | 36.5 |
| $Al_2(SO_4)_3 \cdot 18H_2O$ | 200 | 5.90 | 68.7 |
| $Al_2(SO_4)_3 \cdot 18H_2O$ | 300 | 7.00 | 65.4 | as the ferric compounds in the neutral pH region, provided that they are combined with the above-mentioned oxidants (as indicated by double asterisks).

The recycling of the sludge settled by flocculation into the flocculating region produces larger flocs. This ensures more complete separation and makes it possible to obtain very pure and clean treated water.

EXAMPLE 1

Through a flocculating reaction vessel having a net capacity of 6 liters (including 0.5 liter for the flocculating region and 3 liters for the floc separating tank), sewage from a sedimentation tank was continuously passed at a rate of 4.2 liters an hour, while a 10 percent ferric sulfate solution was being added to maintain a $Fe^{3+}$ concentration of 40 p.p.m. The slurry that precipitated was circulated by an air lift pump at a rate of 1 liter an hour. The pH of the sewage was 7.4 and that of the treated water was 5.10. Next, the air lift pump was stopped and the circulation of the slurry was discontinued, but otherwise under the same conditions as above, the operation was kept on. The qualities of the treated waters obtained in these ways are compared in Table 2.

TABLE 2

| Water quality | Sewage | Treated water slurry circulated | Treated water slurry not circulated |
|---|---|---|---|
| Turbidity | | 1.5 | 14.8 |
| C.O.D. | 396 p.p.m. | 34.5 p.p.m. | 48.2 p.p.m. |
| B.O.D. | 250 p.p.m. | 15.8 p.p.m. | 30.0 p.p.m. |

It will be seen from the table that the circulation of the slurry during flocculation greatly facilitates the separation of the suspended matter and, at the same time, enhances the ability of the coagulant to separate the organic matter from the sewage.

EXAMPLE 2

Using the same apparatus as employed in Example 1, the same sewage was passed therethrough at the same flow rate, with the continuous addition of a 10 percent ferrous sulfate solution to maintain a $Fe^{2+}$ concentration of 40 p.p.m. together with a 30 percent hydrogen peroxide solution to maintain a hydrogen peroxide ($H_2O_2$) concentration of 12 p.p.m. The slurry thereby flocculated and settled was circulated through the flocculating tank by an air lift pump at a rate of one liter an hour. Next, the slurry circulation was stopped but otherwise the operation was continued. The comparative results are given in Table 3.

TABLE 3

| Water quality | Sewage | Treated water slurry circulated | Treated water slurry not circulated |
|---|---|---|---|
| Turbidity | | 1.8 | 9.4 |
| C.O.D. | 408 p.p.m. | 38.7 p.p.m. | 49.6 p.p.m. |
| B.O.D. | 220 p.p.m. | 18.0 p.p.m. | 27.0 p.p.m. |

EXAMPLE 3

The procedure of Example 2 was repeated except that hydrogen peroxide as the oxidant was replaced by sodium hypochlorite, which was added to maintain an available chlorine amount of 5 p.p.m. The results were similar to those obtained with hydrogen peroxide, as shown in Table 4.

TABLE 4

| Water quality | Sewage | Treated water slurry circulated | Treated water slurry not circulated |
|---|---|---|---|
| Turbidity | | 1.4 | 10.5 |
| C.O.D. | 408 p.p.m. | 36.9 p.p.m. | 47.8 p.p.m. |
| B.O.D. | 220 p.p.m. | 18.5 p.p.m. | 28.2 p.p.m. |

Then, according to the process of the present invention, the sewage of a low organic matter concentration obtained by separation from the sludge in the manner above described is led into an aeration tank in which iron floc is formed, so that while the sewage is being aerated the microorganisms present in the water is adsorbed on the iron floc.

This phase of treatment includes the steps of producing an iron-based floc in the aeration tank, introducing water that contains organic matter in a low concentration into the tank, agitating and mixing the floc and water under aerobic conditions, thereby permitting the generation and breeding of microorganisms on the organic matter present in the water as the nutrition source, allowing the microorganisms to be adsorbed on the iron-based floc, and separating the water in the sedimentation region into clear treated water and floc layer. The microorganism-containing iron floc formed in this manner not merely decomposes organic matter in a low concentration but is also able to oxidize ammoniacal nitrogen to nitric acid-type nitrogen. The iron floc that contains microorganisms readily settles, and because the effluent from the flocculation treatment of sewage is utilized, the load of organic matter is light and the production of sludge is limited. Consequently, the recycling of sludge may be dispensed with by providing, as shown, a sedimentation basin 2 in an aeration tank 1 so that the solid-liquid separation is accomplished within one and the same tank.

The water obtained by a series of treatments above described and the water treated by the activated sludge method were compared in respect of their B.O.D. and C.O.D. values. The results, given in Table 5, show that the former is by far the better in quality.

TABLE 5

| Value (p.p.m.) | Water biologically treated by invention | Water treated by activated sludge method |
|---|---|---|
| B.O.D. | Under 1–3 | 10–30 |
| C.O.D. | 1.6–25 | 50–100 |

EXAMPLE 4

1. An aeration tank having a built-in sedimentation region (capacity: aeration region, 8 liters; and sedimentation region, 4 liters) was filled with water, ferric sulfate was added to maintain a $Fe^{3+}$ concentration of 400 p.p.m., the pH was adjusted to 6.0 with caustic soda, and iron floc was formed. While the water that contained the iron floc so formed was being quietly aerated, the flocculation treated water obtained in accordance with Example 1 was passed through the tank at a rate of 2 liters an hour.

After the lapse of one week, oxidation of ammonia and the activity for decomposition of organic matter were accelerated. From the end of a two-week period onward, stabilized progress of decomposition was observed. (The results of progress of treatment during the period from the end of the second week till the 30th day are given in Table 6(1).)

2. Concurrently, through an aeration tank of the same construction as used in (1) above, water was passed for aeration at a flow rate of 2 liters an hour, without forming the iron floc. One month later, little decomposition of organic matter and ammonia oxidation were observed. Even if microorganisms were found generating in the aeration tank, they were either deposited on the tank wall or flown out in a suspended state, and failed to keep up a constant amount as sludge.

3. Next, activated sludge of treated sewage was added to the aeration tank to maintain a concentration of 2,000 p.p.m., and iron salt-flocculated water was passed through the tank at the same flow rate as above for one month.

In this case, adequate oxidation of the ammoniacal nitrogen was observed but the sludge was dispersed, the treated water gained added turbidity, and the decomposition rate of organic matter dropped.

The results of these experiments (1) to (3) are compared in Table 6. It is obvious that the aeration with the addition of iron floc stably satisfies and reduces the B.O.D. and C.O.D. and that, once iron floc is added, no replenishment of iron is required for one month or even a longer period and a stabilized sludge floc ratio is maintained throughout.

| Aeration time | C | | D | |
|---|---|---|---|---|
| | C.O.D. | $Fe^{2+}$ | C.O.D. | $Fe^{2+}$ |
| hr | p.p.m. | p.p.m. | p.p.m. | p.p.m. |
| 0 | 81 | 10.8 | 85 | 10.7 |
| 0.5 | 78 | 10.5 | 62 | 10.4 |
| 1 | 79 | 10.5 | 48 | 10.6 |
| 2 | 76 | 10.2 | 35 | 10.4 |
| 3 | 78 | 9.7 | 33 | 9.9 |
| 5 | 78 | 9.1 | 30 | 9.3 |
| 8 | 75 | 7.9 | 29 | 9.4 |
| 20 | — | — | — | — |

TABLE 6

| | | Treated water | | |
|---|---|---|---|---|
| Water quality | Untreated sewage | With iron floc (1) | Without iron floc (2) | Activated sludge method (3) |
| Turbidity | 1.0–50 (2.0) | 26–28 (1.6) | 26–83 (42) | 7.5–11.5 (82) |
| B.O.D. | 158–364 (23.6) | <1–3 (—) | 13.9–35.8 (24.6) | 8.6–23.5 (13.2) |
| C.O.D. | 34.4–72.8 (58.3) | 16.0–26.3 (20.5) | 30.3–70.6 (50.2) | 25.9–58.5 (39.8) |
| $NH_3$-N | 11–21 (17.3) | Undetected | 10–21 (16.5) | Tr.–8.7 (3.2) |
| $NO_3$-N | 0 (0) | 10–22 (17.5) | 0 (0) | 4.5–20.5 (13.4) |
| Sludge conc., p.p.m. | | Initial 1,320 | 10.8 | 2,050 |
| | | 30th day 2,330 | 40.3 | 1,320 |

The formation of iron floc for the process of the invention can be effected by allowing ferrous ions to be present in the water containing organic material in a low concentration in the course of the treatments above described.

To be more exact, by aerating the flocculated water that contains ferrous ions, it is possible to produce in the aeration tank an iron-microorganism floc which is most readily settleable and is capable of decomposing organic matter in a stabilized way. The formation of the iron-microorganism floc leads to purification of the sewage through the reduction of the B.O.D. to an undetectable degree.

The iron-microorganism floc combines the ability to oxidize ferrous ions to a ferric state with the ability to decompose organic matter.

In Table 7 there are shown the results of experiments made using a synthetic substrate of 3 parts glucose and one part peptone to clarify the properties of the iron-microorganism floc. In the table the experiments A, B and C were conducted using the iron-microorganism flocs obtained by the experiments to be described later in Example 5. The floc of the experiment C was heated at 80° C for 15 minutes to kill off the bacterial activity. To the flocs of the experiments A and C, ferrous sulfate was added to maintain Fe ion concentration of 10 p.p.m. in each floc. In the experiment D, activated sludge of sewage was added to the same synthetic medium in the presence of Fe ions.

TABLE 7

| Aeration time | A | | B | |
|---|---|---|---|---|
| | C.O.D. | $Fe^{2+}$ | C.O.D. | $Fe^{2+}$ |
| hr | p.p.m. | p.p.m. | p.p.m. | p.p.m. |
| 0 | 83 | 10.5 | 81 | <0.1 |
| 0.5 | 68 | 0.2 | 78 | <0.1 |
| 1 | 55 | <0.4 | 77 | |

| Aeration time | A | | B | |
|---|---|---|---|---|
| | C.O.D. | $Fe^{2+}$ | C.O.D. | $Fe^{2+}$ |
| hr | p.p.m. | p.p.m. | p.p.m. | p.p.m. |
| 2 | 32 | <0.1 | 53 | |
| 3 | 21 | | 31 | |
| 5 | 16 | | 24 | |
| 8 | 16 | | 23 | |
| 20 | 17 | | 23 | |

All the data represent the results of aeration with the floc concentration kept at 3,000 p.p.m. and the pH at 6.5.

In the iron-microorganism floc A the ferrous ions rapidly disappeared, but the ferrous ions in the floc heat treated C and the activated sludge D were kept almost constant. It is presumed from this that ferrous ions have been oxidized to a ferric state and transformed into an insoluble ferric compound by the action of microorganisms present in the iron-microorganism floc. Non-biological oxidation due to the aeration may be considered practically negligible.

Also it is clear that the reduction of C.O.D. is attributable to the activity of microorganisms. In the cases of A and B where the iron-microorganism floc was used, the decomposition efficiency was higher than in C which relied upon active sludge. Between A and B, it is evident that the former, with the addition of ferrous ions, shows greater initial C.O.D. reduction by decomposition of organic matter and also a fairly lower C.O.D. value 5 hours later, than those of B. These may well be taken as indications of the fact that the presence of ferrous ions is materially contributory to the reduction of C.O.D.

As noted above, the iron-microorganism floc has the ability of oxidizing ferrous ions and treats the water that contains ferrous ions. Naturally the iron content of the floc is high, the iron accounting for 30 to 40 percent of the floc amount. Because of the high iron content, the floc has good settleability, and the resulting sludge has high density. For example, the S.V.I. of the iron-microorganism floc produced by the process of the invention ranges from 20 to 30, whereas that of active sludge is usually around 100. This is another important feature of the floc according to the invention.

The excellent capability of the iron-microorganism floc may appear to justify the use of ordinary coagulants, such as aluminium sulfate and lime, in the first-stage flocculation. However, we found that a coagulant consisting of either a ferric salt alone or a ferrous salt and an oxidant possesses a greater flocculation effect than any other existing coagulants, and is effective and advantageous over a broad pH range. This has been confirmed when sanitary sewage was continuously introduced into a 20-liter flocculation-sedimentation tank at a rate of 15 liters an hour and various kinds of coagulants were added for comparison purposes, as will be discussed in the examples to be given later.

Flocculation of sewage by use of a ferric salt produces some ferrous ions because the water treated in the sedimentation and separation tank is reduced. Therefore, ferrous ions may be added to the biological treating tank in an amount only enough to make up for the deficiency. As an alternative, it is feasible to add a ferrous salt to the flocculation treating tank, oxidize the Fe ions necessary for flocculation with an oxidant, such as hydrogen peroxide, flocculating them in the form of ferric ions which take part in the flocculation and sedimentation, and subjecting the flocculated water that contains ferrous ions directly to a biological treatment. Particularly useful for the practical purpose are a ferric salt and combinations of a ferrous salt and hydrogen peroxide or the like.

By the process of treatment above described, it is made possible, as indicated in the following examples, to obtain treated water which has a turbidity ranging from 0.5 to 2.0, C.O.D. of 10 to 20 p.p.m., Fe ion content of 0.1 p.p.m. or less, phosphate ion content of 0.1 p.p.m. or less, or B.O.D. of 1 p.p.m. or less. Thus the present process can be a very important one for the prevention of enrichment of rivers and for the reuse of water recovered by sewage disposal.

EXAMPLE 5

The sewage from a first settling basin of sand beds was passed, at a flow rate of 20 liters an hour, through a flocculation-sedimentation tank composed of a 4-liter flocculator and a 20-liter sedimentation-separation tank. The sewage was continuously flocculated with the addition of ferric sulfate to a proportion of 200 p.p.m. and maintaining the pH in the range of 5.5 to 6.5.

Next, three aeration tanks (hereinafter called aeration tanks A, B and C) were arranged side by side. Each tank consisted of a 24-liter aerating region and a 12-liter settling region and was so constructed as to permit the settled sludge to flow back to the aerating region. Through each of these aeration tanks the flocculated water was passed at a flow rate of 6 liters an hour.

At the same time, ferrous sulfate was continuously added to the flocculated water in the aeration tank A to maintain a Fe ion content of 10 p.p.m. In the aeration tank B, floc of ferric hydroxide was suspended beforehand to a concentration of 500 p.p.m. and the flocculated water was passed without the addition of ferrous ions. Through the aeration tank C the flocculated water was not passed but untreated sewage was introduced and was treated by the usual activated sludge method (retention time 4 hours and sludge volume 3,000 to 4,000 p.p.m.). After an acclimation period of two weeks, continuous treatment was carried out for 30 days. The results as mean values are given in Table 8.

From these results it is manifest that the treatment A according to the process of the invention is much superior to the activated sludge method C in the removal of turbidity, C.O.D., B.O.D. And phosphoric acid. Further, as compared with the case B where the floc of ferric hydroxide is allowed to be present beforehand but ferrous ions are not added, the procedure A which involves the continuous addition of ferrous ions to the flocculating water can provide further reduction of the C.O.D.

TABLE 8

| Water quality | Untreated sewage | Flocculated water | Finally treated water | | |
|---|---|---|---|---|---|
| | | | Tank A | Tank B | Tank C |
| Turbidity | | 10.2 | 1.2 | 1.8 | 9.2 |
| C.O.D. p.p.m. | 250 | 98.2 | 14.5 | 21.1 | 39.6 |
| C.O.D. | 111 | 32.0 | <1.0 | <1.0 | 16.0 |
| $PO_4$ | 10.5 | 1.2 | <0.1 | <0.1 | 7.2 |

EXAMPLE 6

Using the same apparatus as in Example 5, the same amount of water was passed. To the untreated sewage being introduced were added ferrous sulfate to maintain a Fe ion content of 40 p.p.m. and hydrogen peroxide to a concentration of 10 p.p.m. The water containing such addition agents was then led to a flocculation reaction tank. The quality of the flocculated water, as given in Table 9, makes it possible to expect substantially the same effect as by the flocculation with ferric sulfate described in Example 5. In the similar way the flocculated water was led to the aeration tank. After two weeks of aeration, stable treated water was obtained. The mean water quality obtained in the period between the third and fifth weeks was as shown in Table 9, and it will be appreciated by one skilled in the art that an adequately stable treatment is possible in accordance with the present process.

TABLE 9

| Water quality | Untreated sewage | Flocculated water | Final treated water |
|---|---|---|---|
| C.O.D. p.p.m. | 248 | 96.3 | 16.2 |
| B.O.D. p.p.m. | 113 | 33.4 | under 1.0 |
| $PO_4$ p.p.m. | 9.8 | 1.2 | under 0.1 |

REFERENTIAL EXAMPLES OF EXPERIMENTS WITH COAGULANTS

Next, untreated sewage was continuously passed, at a flow rate of 15 liters an hour, through a 20-liter flocculation-sedimentation tank, and many different coagulants were added one after another to compare their flocculating effects. The results are given in Table 10.

TABLE 10

| Coagulant | Amount added | Floc pH | C.O.D. of treated water |
|---|---|---|---|
| | p.p.m. | | p.p.m. |
| None (untreated sewage) | 0 | 7.1 | 260 |
| $FeCl_3 \cdot 6H_2O$ | 200 | 5.5 | 79.1 |
| $Fe_2(SO_4)_3 \cdot 18H_2O$ | 200 | 5.3 | 73.5 |
| $FeSO_4 \cdot 7H_2O$ | 200 | 11.8 | 98.2 |
| $FeSO_4 \cdot 7H_2O +$ 30% $H_2O_2$ | 200 0.04ml/l | 6.2 | 76.5 |
| $Al_2(SO_4)_3 \cdot 18H_2O$ | 200 | 5.9 | 103.1 |

It will be seen from this table that, in the treatment by flocculation of sanitary sewage or the like, iron salt, particularly ferric compounds, are most effective in producing flocs, and even when a ferrous compound is used, it can achieve a similarly satisfactory flocculation in the neutral pH region provided that it is employed in combination with an oxidant.

With the composition above described, the present invention has the following advantages:

1. In the stage of flocculation according to the invention, the use of an iron salt, especially either a ferric salt or a combination of a ferrous salt and an oxidant, is effective in achieving a greater flocculation effect than by any other coagulant. Particularly noteworthy is the fact that a ferrous salt and an oxidant may be combinedly used in place of a ferric salt which is usually expensive and hardly available, to achieve the same effect.

2. Turbidity components and organic matter are separated to very high degrees because the floc (slurry) that has been settled by a coagulant in the course of the treatment above described is recycled to the flocculating region.

3. In the course of biological treatment according to the invention, an iron-based floc produced in an aeration tank is mixed in the low-concentration treated water that has been obtained in the flocculation process, so that microorganisms are grown whereby the organic matter present in the water is decomposed and the microorganisms are adsorbed on the iron floc. As the result, the purity or cleanness of the treated water is extremely high.

4. Since the floc is highly settleable, it is possible, for example, to provide a sedimentation basin within the aeration tank and omit the means to recycle the sludge.

5. The biological treatment of the water pretreated by flocculation gives finally treated water which is very clear and sparkling.

What is claimed is:

1. A process for purifying water that contains organic matter which comprises mixing a coagulant consisting of either a ferric salt alone or a ferrous salt and an oxidant into sewage that contains organic matter in a high concentration, causing the coagulant-containing sewage to flow into a flocculating region, agitating the sewage for floc formation and growth, separating the floc into effluent and sludge, thus obtaining a sewage that contains organic matter in a low concentration, introducing said sewage into an aeration tank in which iron floc is formed, allowing microorganisma to be adsorbed on the iron floc while the sewage is being aerated in said tank, thereby to obtain highly pure treated water.

2. A process for purifying water according to claim 1 wherein the sewage containing organic matter in a low concentration is aerated with ferrous ions present therein, so that the iron floc can be formed.

3. A process for purifying water according to claim 1 wherein the sludge separated out by flocculation is recycled to the flocculating region.

4. A process for purifying water according to claim 1 wherein the ferric salt is a salt selected from the group consisting of ferric chloride and ferric sulfate.

5. A process for purifying water according to claim 1 wherein the ferrous salt is a salt selected from the group consisting of ferrous sulfate and ferrous chloride, and the oxidant is one selected from the group consisting of hydrogen peroxide and chlorine.

6. A water purification process for removal of organic matter from sewage comprising, establishing a pool of water to be purified, said water containing a high concentration of organic matter;

adding a coagulant consisting of a ferric salt selected from the group consisting of ferric chloride and ferric sulfate;

introducing the coagulant-containing sewage into a flocculating region;

agitating the sewage for floc formation and growth;

separating the sewage in a sedimentation region into effluent and sludge;

said sludge being separated out by flocculation being recycled to the flocculating region;

obtaining a resulting sewage containing organic matter in a low concentration, introducing said low concentration sewage into an aeration tank having ferrous ions present therein;

iron floc being formed in said tank; and allowing micro-organisms to be adsorbed on the iron floc while the sewage is being aerated in said tank.

7. A water purification process as claimed in claim 6, further comprising the steps of:

adjusting the pH on the alkaline side at least to 11.5, and combining the ferric salt with an oxidant selected from the group consisting of hydrogen peroxide, chloride and sodium hypochlorite.

8. A water purifying process as claimed in Claim 1, further comprising the steps of:

introducing the sewage into an aeration tank in which iron floc is formed while the sewage is being aerated the microorganisms present is adsorbed;

introducing water that contains organic matter in a low concentration into the tank, agitating and mixing the floc and water under aerobic conditions;

allowing the microorganisms to be adsorbed on the iron-based floc, and separating the water in the sedimentation region into clear treated water and floc layers.

9. A water purifying process as claimed in claim 1, further including the step of using a synthetic substrate of 3 parts of glucose and one part of peptone to clarify the properties of the microorganisms adsorbed on the iron floc.

10. A water purifying process as claimed in claim 1, further comprising the step of using coagulants, selected from the group consisting of aluminum sulfate and lime in the flocculation of the first stage.

11. A water purifying process as claimed in claim 1, further comprising the step of adding ferrous ions to the coagulant containing sewage.

12. A water purifying process as claimed in claim 1, said step of introducing said sewage into an aeration tank, comprising the steps of introducing it in sequence into three tanks connected in parallel, permitting the sludge to settle in each tank and ducting the remaining flow from each tank back into the first aerating tank;

continuously adding ferrous sulfate to the flocculated water in the first tank to maintain a Fe ion content of 10 p.p.m;

suspending floc of ferric hydroxide in the second tank and passing the flocculated water therethrough, and introducing untreated sewage into the third tank and treating it with activated sludge.

13. A water purifying process as claimed in claim 12, further comprising the step of adding to the untreated sewage in the third tank ferrous sulfate to maintain a Fe ion content of 40 p.p.m. and hydrogen peroxide to a concentration of 10 p.p.m.

* * * * *